(12) United States Patent
Suzuki et al.

(10) Patent No.: US 10,393,180 B2
(45) Date of Patent: Aug. 27, 2019

(54) BEARING RING FOR ROLLER BEARING, MANUFACTURING METHOD OF BEARING RING FOR ROLLER BEARING, AND NEEDLE ROLLER BEARING

(71) Applicant: JTEKT CORPORATION, Osaka-shi, Osaka (JP)

(72) Inventors: Kensuke Suzuki, Kashiwara (JP); Wataru Yoshida, Kashiba (JP); Nicolas Vincent Barbi, Kashiba (JP); Tsuyoshi Mikami, Yamatotakada (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 16/111,528

(22) Filed: Aug. 24, 2018

(65) Prior Publication Data
US 2019/0072132 A1    Mar. 7, 2019

(30) Foreign Application Priority Data

Sep. 4, 2017    (JP) .................................. 2017-169696

(51) Int. Cl.
| | |
|---|---|
| *F16C 33/62* | (2006.01) |
| *F16C 19/46* | (2006.01) |
| *F16C 33/64* | (2006.01) |
| *F16C 33/58* | (2006.01) |

(52) U.S. Cl.
CPC .............. *F16C 33/62* (2013.01); *F16C 19/46* (2013.01); *F16C 19/466* (2013.01); *F16C 33/585* (2013.01); *F16C 33/64* (2013.01); *F16C 2202/04* (2013.01); *F16C 2202/66* (2013.01); *F16C 2223/10* (2013.01)

(58) Field of Classification Search
CPC ........ F16C 19/44; F16C 19/46; F16C 33/583; F16C 33/585; F16C 33/586; F16C 33/62; F16C 33/64; F16C 2202/04; F16C 2223/10; F16C 19/466
See application file for complete search history.

(56) References Cited

U.S. PATENT DOCUMENTS 9,709,099 B2 *    7/2017    Yoshida .................. F16C 33/62

FOREIGN PATENT DOCUMENTS

| JP | 2013-238274 A | 11/2013 |
|---|---|---|
| WO | WO2017175756 | * 10/2017 |

* cited by examiner

*Primary Examiner* — James Pilkington
(74) *Attorney, Agent, or Firm* — Oliff PLC

(57) ABSTRACT

A raceway of a roller bearing includes a first raceway whose raceway surface is under a relatively high compressive residual stress, and a second raceway whose raceway surface is under a compressive residual stress lower than the compressive residual stress applied to the raceway surface of the first raceway. The raceway surface of the second raceway has a Vickers hardness of 700 HV or more but less than 800 HV. The raceway surface of the first raceway includes a portion that is harder than the raceway surface of the second raceway and that is to be in contact with at least one of axial ends of a rolling contact surface of a roller. A rib includes a rib surface having a Vickers hardness of 450 HV or more but less than 550 HV.

8 Claims, 11 Drawing Sheets

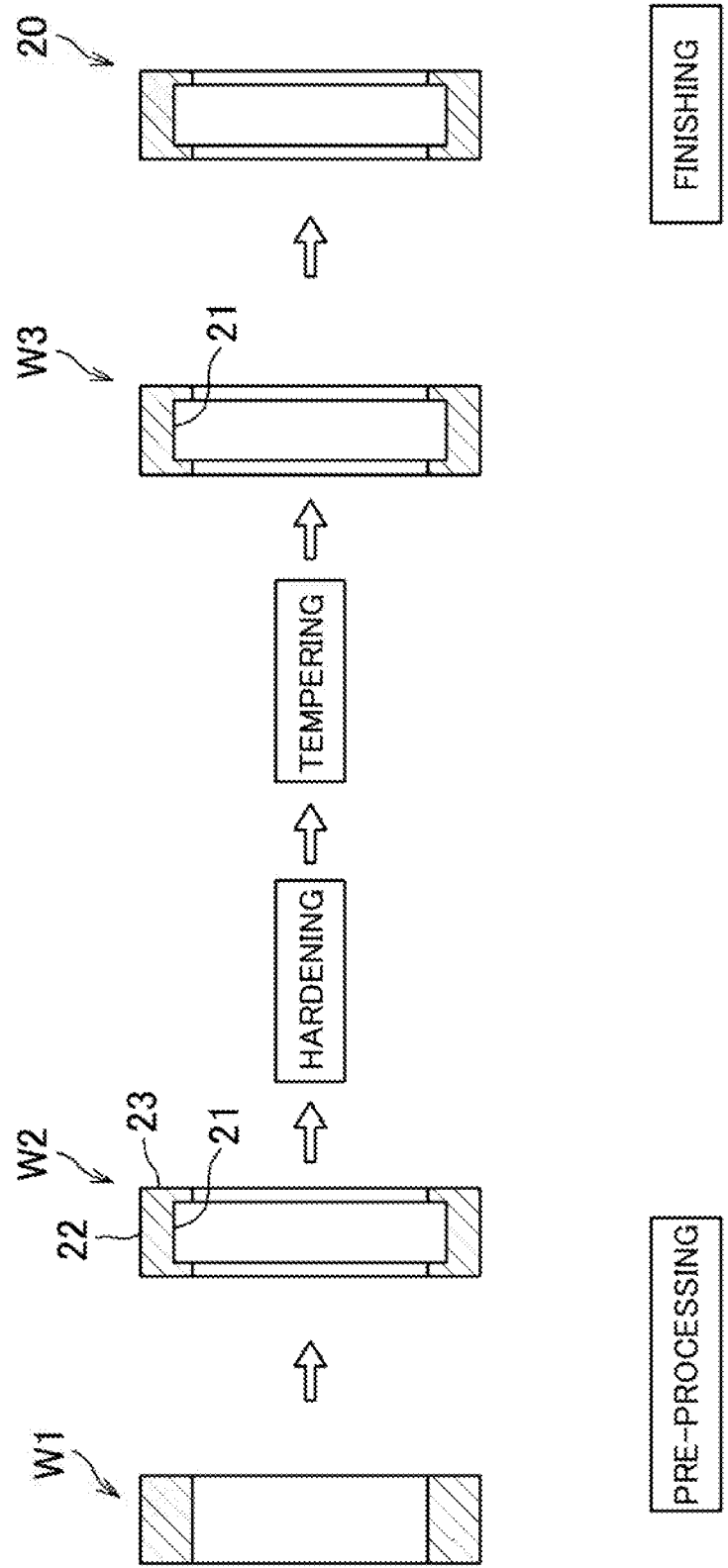

*FIG. 4A*  *FIG. 4B*
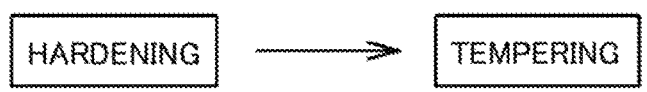
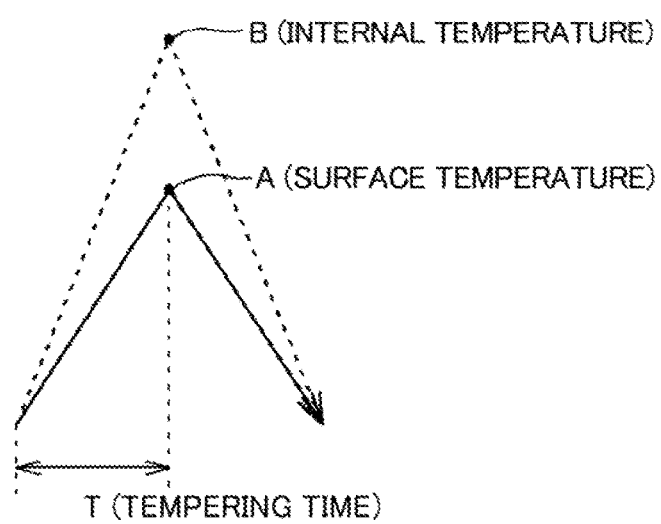
B − A ≥ 40°C
T ≤ 20sec

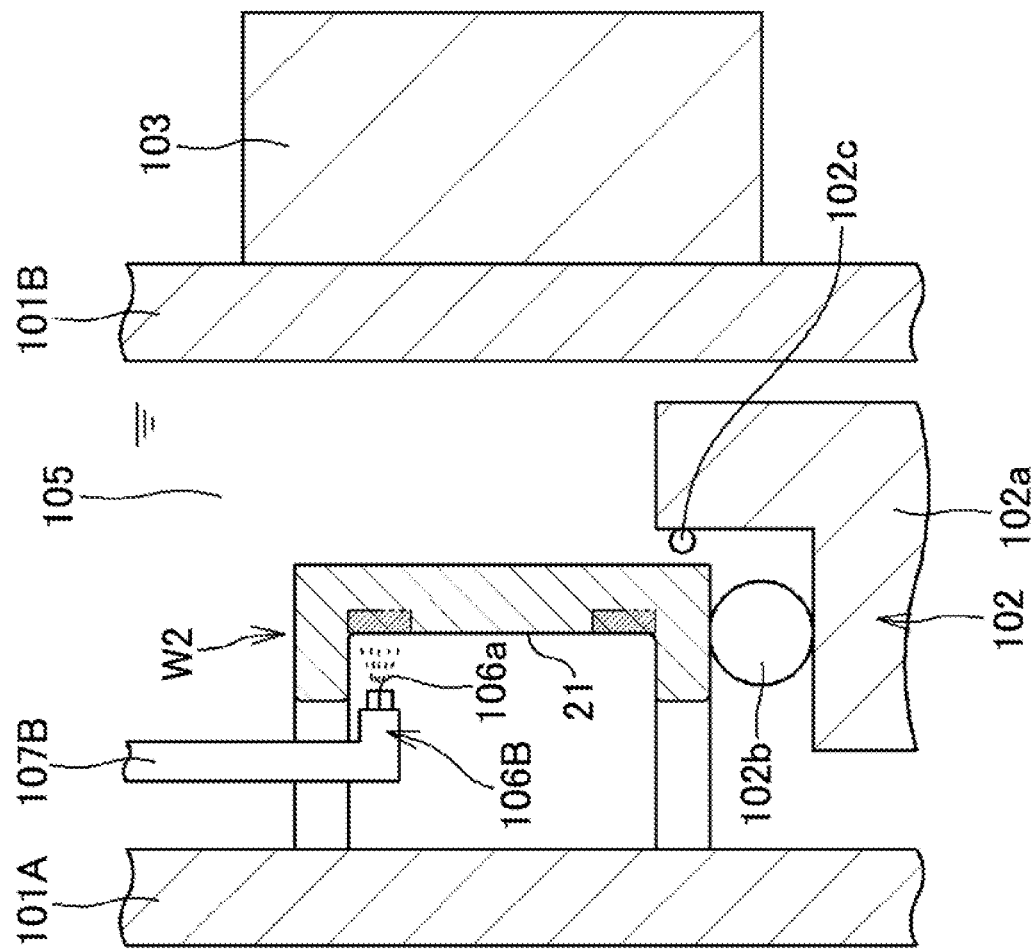

BEARING RING FOR ROLLER BEARING, MANUFACTURING METHOD OF BEARING RING FOR ROLLER BEARING, AND NEEDLE ROLLER BEARING

INCORPORATION BY REFERENCE

The disclosure of Japanese Patent Application No. 2017-169696 filed on Sep. 4, 2017, including the specification, drawings and abstract, is incorporated herein by reference in its entirety.

BACKGROUND OF THE INVENTION

1. Field of the Invention

The invention relates to bearing rings for roller bearings, manufacturing methods of bearing rings for roller bearings, and needle roller bearings including the bearing rings for roller bearings.

2. Description of the Related Art

Bearing rings for roller bearings that are components of roller bearings used in, for example, automobiles and industrial machines include raceways that are to be in relative rolling contact with rolling elements (e.g., rollers). The raceways come into rolling contact with the rolling elements and thus receive loads from the rolling elements. Mechanical characteristics of such raceways significantly influence the rolling fatigue life of roller bearings.

In view of this, studies are being made of techniques to improve mechanical characteristics of such raceways so as to increase the rolling fatigue life of roller bearings. For example, a known technique to increase the hardness of a raceway (or a raceway surface) so as to increase the rolling fatigue life of a roller bearing involves using, as a steel material for a bearing ring, bearing steel that has been subjected to carbonitriding. Japanese Patent Application Publication No. 2013-238274 (JP 2013-238274 A), for example, discloses a technique that involves thermally refining high-carbon chromium bearing steel (such as SUJ2 steel) and then performing induction hardening on only the surface of the steel. This provides a bearing ring having a surface hardness of 700 HV or more and an internal hardness of as low as 340 HV to 490 HV. JP 2013-238274 A also discloses a technique to increase the rolling life of bearings with the use of such bearing rings.

Although the techniques described above improve the rolling fatigue life of roller bearings, these techniques are still susceptible to further improvement. Carbonitriding requires a long-time heat treatment, so that an increase in cost resulting from such a heat treatment is inevitable. Thus, what is desired is a technique to inexpensively increase the rolling fatigue life of roller bearings.

A portion of a raceway of a bearing ring for a roller bearing receives a high load from an end of a rolling contact surface of a roller, creating a region where the pressure of contact between the raceway and the roller is high. The rolling fatigue life of a roller bearing is likely to be influenced by the life of the portion of the raceway that receives a high load. When a bearing ring for a roller bearing includes a rib, roller skewing may cause breakage of the rib. Such rib breakage contributes to a reduction in the life of a roller bearing.

SUMMARY OF THE INVENTION

An object of the invention is to provide long-life roller bearings.

An aspect of the invention provides an annular bearing ring for a roller bearing made of high-carbon chromium bearing steel. The bearing ring includes a rib, an inner layer, and a surface layer. The inner layer is made of tempered martensite or sorbite. The inner layer has a Vickers hardness of 450 HV or more but less than 550 HV. The surface layer is made of tempered martensite. The surface layer surrounds an entirety of a periphery of the inner layer. The surface layer includes a raceway including a raceway surface to be in rolling contact with a roller. The raceway includes a first raceway whose raceway surface is under a relatively high compressive residual stress, and a second raceway whose raceway surface is under a compressive residual stress lower than the compressive residual stress applied to the raceway surface of the first raceway. The raceway surface of the second raceway has a Vickers hardness of 700 HV or more but less than 800 HV. The raceway surface of the first raceway includes a portion that is harder than the raceway surface of the second raceway and that is to be in contact with at least one of axial ends of a rolling contact surface of the roller. The rib includes a rib surface having a Vickers hardness of 450 HV or more but less than 550 HV.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIGS. 3A to 3E are diagrams illustrating steps of a method for manufacturing the outer ring illustrated in FIG. 2;

FIG. 4A is a diagram illustrating a hardening process illustrated in FIG. 3C;

FIG. 4B is a diagram illustrating a tempering process illustrated in FIG. 3D;

FIG. 5B is an enlarged view of main components of the heat treatment apparatus illustrated in FIG. 5A;

DETAILED DESCRIPTION OF EMBODIMENTS

Figure 1:
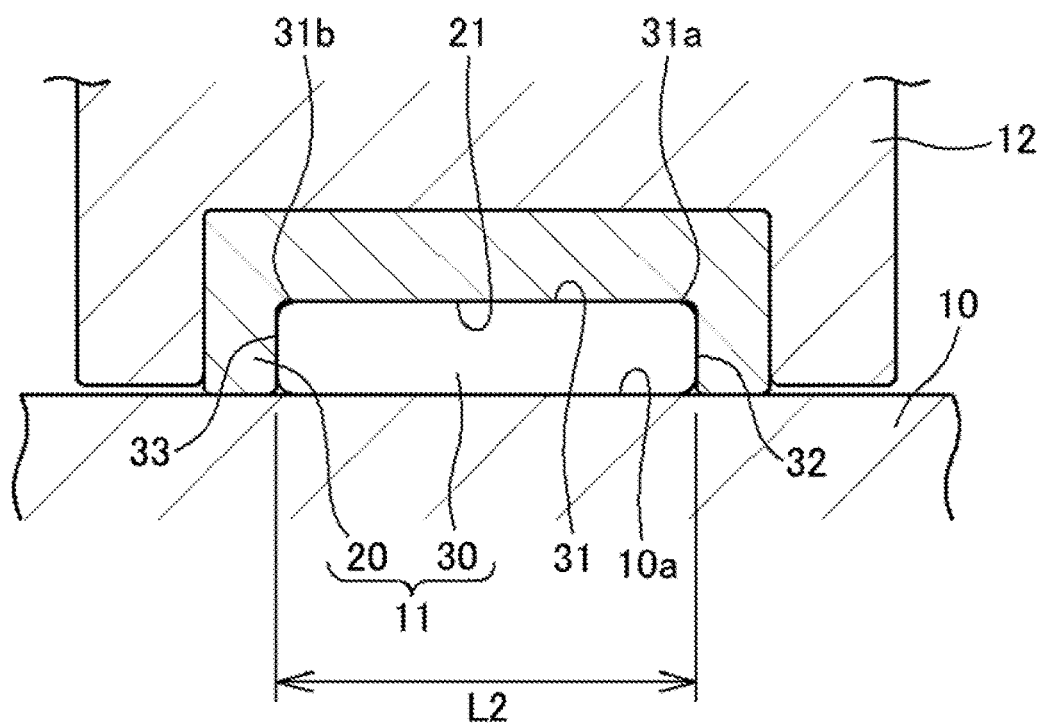
FIG. 1 is a cross-sectional view of main components of a needle roller bearing according to an embodiment of the invention.

A roller bearing according to an embodiment of the invention is a needle roller bearing 11. First, the needle roller bearing 11 according to the present embodiment will be described. FIG. 1 is a cross-sectional view of main components of the needle roller bearing 11 according to the present embodiment. The needle roller bearing 11 according to the present embodiment includes: an outer ring 20 provided on its inner peripheral surface with a raceway; and a plurality of needle rollers 30 disposed radially inward of the outer ring 20. The needle roller bearing 11 is a drawn cup needle roller bearing with no inner ring. The needle roller bearing 11 is pressed-fitted to a housing 12 such that a shaft 10 is rotatably supported by the needle roller bearing 11. The needle roller bearing 11 is a full complement bearing with no cage. In one example, the outer ring 20 and the needle rollers 30 are made of high-carbon chromium bearing steel, such as SUJ2 steel or SUJ3 steel.

Rolling contact surfaces 31 of the needle rollers 30 of the needle roller bearing 11 are in rolling contact with an outer ring raceway surface 21 and an outer peripheral surface 10a of the shaft 10. A first axial end of the rolling contact surface 31 of each needle roller 30 is provided with an edge 31a continuous with a roller end face 32. A second axial end of the rolling contact surface 31 of each needle roller 30 is provided with an edge 31b continuous with a roller end face 33. The edges 31a and 31b of the rolling contact surface 31 of each needle roller 30 are each in contact with the outer ring raceway surface 21 at a high contact pressure. This produces "edge loads" in the vicinities of the edges 31a and 31b.

With this in view, the outer ring 20 of the needle roller bearing 11 is a bearing ring according to the present embodiment. The raceway of the bearing ring according to the present embodiment includes a first raceway (including two first raceway portions) having a high compressive residual stress. Thus, the needle roller bearing 11 has a long rolling fatigue life, sufficient resistance to shock, and sufficient crushing strength.

Figure 2:
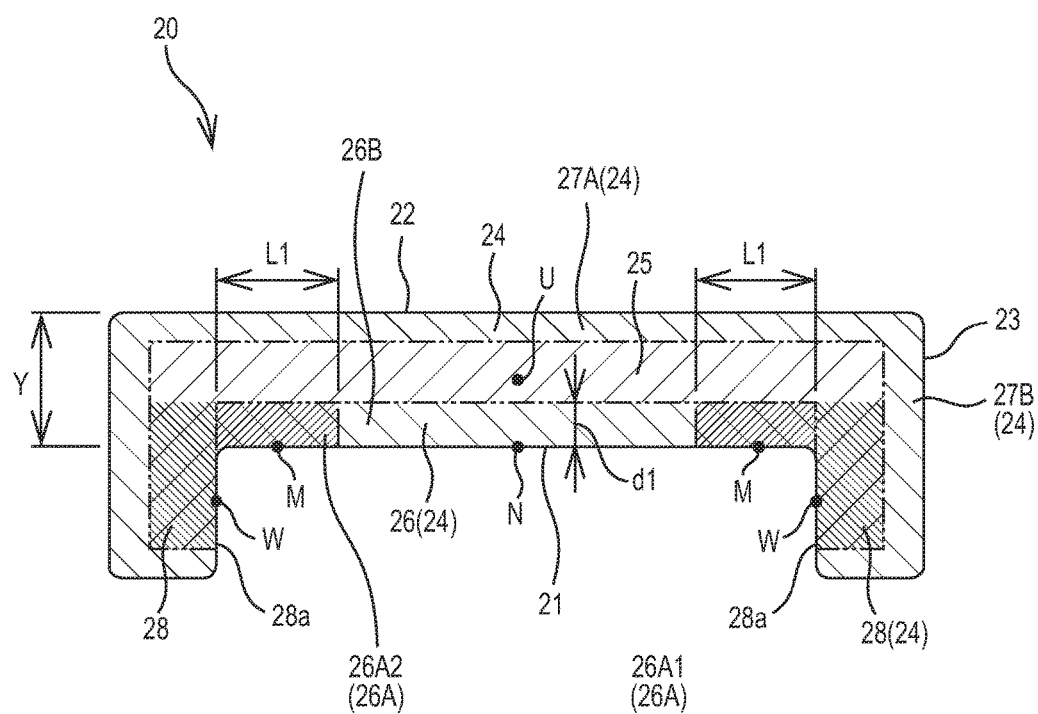
FIG. 2 is a cross-sectional view of main components of an outer ring of the needle roller bearing illustrated in FIG. 1.

The outer ring 20 of the needle roller bearing 11 (see FIG. 1), which is an example of the bearing ring for a roller bearing according to the present embodiment, will be described below with reference to FIG. 2. FIG. 2 is a cross-sectional view of main components of the outer ring 20 of the needle roller bearing 11 illustrated in FIG. 1. As used herein, the term "Vickers hardness" refers to a value measured when a Vickers indenter is brought into contact with a cut surface obtained by cutting a surface of a bearing ring for a roller bearing (e.g., an outer ring) or the bearing ring in a radial direction thereof.

The outer ring 20 illustrated in FIG. 2 includes: an inner layer 25; and a surface layer 24 surrounding an entirety of the periphery of the inner layer 25. The inner layer 25 has a tempered martensite structure or sorbite structure. The inner layer 25 has a Vickers hardness of 450 HV or more but less than 550 HV. Providing the inner layer 25 just described enables the outer ring 20 to have sufficient crushing strength and sufficient resistance to shock. If the inner layer 25 has a Vickers hardness of less than 450 HV, the crushing strength of the outer ring 20 will be insufficient. If the inner layer 25 has a Vickers hardness of 550 HV or more, the shock resistance of the outer ring 20 will be insufficient.

The surface layer 24 surrounds an entirety of the periphery of the inner layer 25. The surface layer 24 includes a raceway 26, a rib 28, a non-raceway portion 27A, and a non-raceway portion 27B. The surface of the raceway 26 is defined by the outer ring raceway surface 21 to be in rolling contact with the needle rollers 30 (see FIG. 1). The rib 28 is provided axially outward of the outer ring raceway surface 21. The surface of the non-raceway portion 27A is defined by an outer peripheral surface 22 of the outer ring 20. The surface of the non-raceway portion 27B is defined by a lateral surface 23 of the outer ring 20. The surface layer 24 has a tempered martensite structure. In one example, the surface layer 24 mainly consists of high-carbon martensite.

Only a portion of the surface layer 24 adjacent to the rib surface of the rib 28 is made of high-carbon martensite or low-carbon martensite. As used herein, the term "high-carbon martensite" refers to a martensitic structure containing a large amount of carbon in solid solution. As used herein, the term "low-carbon martensite" refers to a martensitic structure containing a smaller amount of carbon in solid solution than high-carbon martensite. Low-carbon martensite tempered at a high temperature has an unclear martensitic structure. In contract, high-carbon martensite tempered at a low temperature has a clear martensitic structure. Thus, high-carbon martensite and low-carbon martensite are distinguishable from each other.

A surface of the surface layer 24 defined by the outer ring raceway surface 21 has a predetermined Vickers hardness higher than the Vickers hardness of the inner layer 25. The raceway 26 whose surface is defined by the outer ring raceway surface 21 includes a first raceway 26A and a second raceway 26B. The first raceway 26A includes two first raceway portions 26A1 and 26A2. The first raceway 26A is provided such that the first raceway 26A includes a region where the pressure of contact between the first raceway 26A and the rolling contact surface 31 of each needle roller 30 is high. This region will hereinafter be referred to as an "edge load region". The second raceway 26B is a portion of the raceway 26 other than the first raceway 26A. In the present embodiment, the surface of the second raceway 26B defined by the outer ring raceway surface 21 has a Vickers hardness of 700 HV or more but less than 800 HV. If the surface of the second raceway 26B has a Vickers hardness of less than 700 HV, the rolling fatigue life of the needle roller bearing 11 including the outer ring 20 will be reduced. If the surface of the second raceway 26B has a Vickers hardness of 800 HV or more, the shock resistance of the needle roller bearing 11 will be degraded.

The surface of the first raceway 26A defined by the outer ring raceway surface 21 has a Vickers hardness higher than the Vickers hardness of the surface of the second raceway 26B. This improves mechanical characteristics of the first raceway 26A so as to increase the rolling fatigue life of the needle roller bearing 11 including the outer ring 20. The surface of the first raceway 26A preferably has a Vickers hardness of 725 HV or more but less than 825 HV The Vickers hardness of the surface of the first raceway 26A is preferably higher than the Vickers hardness of the surface of the second raceway 26B by 25 HV or more. This is because the first raceway 26A whose surface has such a Vickers hardness is suitable for increasing the rolling fatigue life of the needle roller bearing 11. The Vickers hardness of the raceway 26 of the outer ring 20 may gradually decrease from the surface of the surface layer 24 toward the inner layer 25.

The rib 28 of the surface layer 24 includes a rib surface 28a having a Vickers hardness of 450 HV or more but less than 550 HV. This makes it difficult for the rib 28 of the outer ring 20 to break when skewing of the needle rollers 30 occurs. Thus, the outer ring 20 of the needle roller bearing 11 is unlikely to break. This makes it possible to increase the life of the needle roller bearing 11. If the rib surface 28a has a Vickers hardness of less than 450 HV, the crushing strength of the outer ring 20 may be insufficient. If the rib surface 28a has a Vickers hardness of 550 HV or more, the shock resistance of the outer ring 20 may be insufficient.

As previously described, the surface of the first raceway 26A of the raceway 26 preferably has a Vickers hardness of 725 HV or more but less than 825 HV, and the surface of the second raceway 26B of the raceway 26 preferably has a Vickers hardness of 700 HV or more but less than 800 HV.

In addition, a region of the raceway 26 extending from the outer ring raceway surface 21 toward the inner layer 25 and having a Vickers hardness of 700 HV or more preferably has a predetermined depth. This region may hereinafter be referred to as a "high-hardness surface layer" (see the diagonally shaded areas in FIG. 2). The diagonally shaded areas are represented schematically in FIG. 2 so as to illustrate the depth of the high-hardness surface layer and thus do not accurately reflect the shape and size of the high-hardness surface layer.

The depth of a portion of the high-hardness surface layer corresponding to the second raceway 26B preferably satisfies Inequality (1) below:

$$2.5Z0 \leq d1 < 5.0Z0 \quad (1)$$

In Inequality (1), d1 denotes the depth of the portion of the high-hardness surface layer corresponding to the second raceway 26B, and Z0 denotes a maximum shear stress depth when the needle roller bearing 11 includes the outer ring 20. If $2.5Z0 > d1$, the fatigue strength of the surface of the high-hardness surface layer may decrease, resulting in a reduction in the rolling fatigue life of the outer ring 20. If $d1 \geq 5.0Z0$, the proportion of a region of the high-hardness surface layer softer in structure than the surface of the high-hardness surface layer may decrease, resulting in insufficient toughness of the outer ring 20. In particular, when the outer ring 20 has a large thickness, such a tendency is remarkable. In FIG. 2, the outer ring 20 has a thickness Y of as small as 5 mm or less, for example. In the present embodiment, the maximum shear stress depth Z0 when the outer ring 20 is a bearing ring for a needle roller bearing is about 0.1 mm to about 0.2 mm, although the maximum shear stress depth Z0 varies depending on a rated load.

The depth of a portion of the high-hardness surface layer corresponding to the first raceway 26A preferably satisfies Inequality (2) below:

$$2.5Z0 \leq d2 < 5.0Z0 \quad (2)$$

In Inequality (2), d2 denotes the depth of the portion of the high-hardness surface layer corresponding to the first raceway 26A, and Z0 denotes the maximum shear stress depth. The depth d2 preferably satisfies Inequality (2) for the same reason as the depth d1 preferably satisfies Inequality (1).

The compressive residual stress of the surface of the first raceway 26A is higher than the compressive residual stress of the surface of the second raceway 26B. This further improves mechanical characteristics of the first raceway 26A, making it possible to increase the rolling fatigue life of the needle roller bearing 11 including the outer ring 20. Although the compressive residual stress of the surface of the first raceway 26A is not limited to any particular value, the compressive residual stress of the surface of the first raceway 26A is preferably 200 MPa or more. This makes it more difficult for the outer ring 20 to break and makes it more likely that the rolling fatigue life will increase. If the compressive residual stress of the surface of the first raceway 26A is less than 200 MPa, the rolling fatigue life may be insufficient. Although an upper limit to the compressive residual stress of the surface of the first raceway 26A is not limited to any particular value, the upper limit is preferably 1000 MPa. The first raceway 26A is more preferably provided such that the compressive residual stress of a portion of the first raceway 26A extending from its surface to the depth Z0 is in the range of 200 MPa to 1000 MPa inclusive. This makes it possible to further increase the rolling fatigue life.

The compressive residual stress of the surface of the second raceway 26B is preferably 50 MPa or more. This is because such a compressive residual stress is suitable for increasing the rolling fatigue life. An upper limit to the compressive residual stress of the surface of the second raceway 26B may be any value that is lower than the upper limit to the compressive residual stress of the surface of the first raceway 26A. The compressive residual stress of the surface of the second raceway 26B is preferably less than 1000 MPa. The second raceway 26B is more preferably provided such that the compressive residual stress of a portion of the second raceway 26B extending from its surface to the depth Z0 is 50 MPa or more but less than 1000 MPa. This makes it possible to further increase the rolling fatigue life.

The compressive residual stress of the rib surface 28a of the rib 28 is preferably 200 MPa or more. Such a compressive residual stress makes it more difficult for the rib 28 to break and is thus suitable for increasing the rolling fatigue life of the needle roller bearing 11 including the outer ring 20. The compressive residual stress of the rib surface 28a of the rib 28 is preferably 1000 MPa or less. The compressive residual stress of a portion of the rib 28 extending from the rib surface 28a to the depth Z0 is preferably in the range of 200 MPa to 1000 MPa inclusive. This makes it more difficult for the rib 28 to break and thus further increases the rolling fatigue life of the needle roller bearing 11 including the outer ring 20.

The first raceway portions 26A1 and 26A2 of the first raceway 26A of the outer ring 20 each have an axial length L1 (see FIG. 2). The needle rollers 30 each have a roller width L2 (see FIG. 1). The axial length L1 is preferably equal to 10 to 30 percent of the roller width L2. The length L1 that is less than 10 percent of the roller width L2 makes it difficult to perform positioning such that the first raceway 26A is reliably provided in the edge load region. The length L1 that is greater than 30 percent of the roller width L2 makes it difficult to apply a high compressive residual stress (e.g., a compressive residual stress in the range of 200 MPa to 1000 MPa inclusive) to the surface of the first raceway 26A.

As described above, the outer ring 20 is provided such that the first raceway 26A whose raceway surface is under a high compressive residual stress is disposed at a location including the edge load region of the raceway 26 where the pressure of contact between the raceway 26 and the needle rollers 30 is high. Thus, the needle roller bearing 11 including the outer ring 20 has an increased rolling fatigue life.

The bearing ring for a needle roller bearing according to the present embodiment is manufacturable by, for example, a method described below. The method for manufacturing the bearing ring for a needle roller bearing according to the present embodiment, which will be described below, is a method for manufacturing the outer ring 20. FIGS. 3A to 3E are diagrams illustrating steps of the method for manufacturing the outer ring 20 illustrated in FIG. 2. FIG. 4A is a diagram illustrating a hardening process illustrated in FIG. 3C. FIG. 4B is a diagram illustrating a tempering process illustrated in FIG. 3D. The method described below will be referred to as a "first manufacturing method of a bearing ring".

As illustrated in FIG. 3A, the first manufacturing method of a bearing ring first involves preparing an annular material W1 made of high-carbon chromium bearing steel. As illustrated in FIG. 3B, the first manufacturing method of a bearing ring then involves, for example, cutting the annular material W1 prepared into a predetermined shape so as to perform pre-processing to provide a half-finished product (workpiece) W2 including portions corresponding to the outer ring raceway surface 21, the outer peripheral surface 22, and the lateral surface 23 of the outer ring 20.

As illustrated in FIGS. 3C and 4A, the first manufacturing method of a bearing ring then involves performing a hardening process on the workpiece W2 provided. The hardening process preferably involves uniformly heating an entirety of the workpiece W2 and then rapidly cooling the entirety of the workpiece W2 such that the hardened workpiece W2 is entirely made of martensite and contains five percent or less of an incompletely hardened structure (fine pearlite). If the hardened workpiece W2 contains more than five percent of the incompletely hardened structure, the hardness of the outer ring 20 manufactured may be insufficient, resulting in a reduced rolling fatigue life. The hardening process may be carried out in any other suitable manner. The hardening process may be carried out by performing, for example, induction hardening or through hardening.

The hardening process may involve, for example, heating the workpiece W2 at a hardening temperature of 810° C. to 850° C. for half an hour to two hours and then rapidly cooling the workpiece W2. The hardening temperature is preferably 820° C. or more from the viewpoint of providing sufficient hardenability and is preferably 840° C. or less from the viewpoint of preventing an increase in grain size. The time during which the workpiece W2 is to be heated is preferably half an hour or more from the viewpoint of soaking components and is preferably one and a half hours or less from the viewpoint of preventing an increase in grain size. In one example, the workpiece W2 is rapidly cooled by, for example, oil cooling that involves immersion in cooling oil. The temperature of the cooling oil in which the workpiece W2 is to be immersed is normally 60° C. to 180° C.

As illustrated in FIGS. 3D and 4B, the first manufacturing method of a bearing ring then involves performing a tempering process on the hardened half-finished product (workpiece) W2 so as to provide a semi-finished product W3. The tempering process involves heating the workpiece W2 for a predetermined period of time by induction heating, with the workpiece W2 immersed in a coolant, and then cooling the workpiece W2 in the coolant, for example. Alternatively, the workpiece W2 may be forcibly cooled in air or may be cooled in still air, for example. Thus, as illustrated in FIG. 4B, the tempering process is performed such that the tempering temperature of the surface of the hardened workpiece W2 (see "SURFACE TEMPERATURE A" in FIG. 4B) is lower than the tempering temperature of the inner portion of the workpiece W2 (see "INTERNAL TEMPERATURE B" in FIG. 4B).

Performing the tempering process such that the surface temperature A is lower than the internal temperature B makes it possible to form an inner layer having hardness suitable for providing sufficient shock resistance. In addition, performing the tempering process in a manner that meets the requirements mentioned above makes it possible to suppress a reduction in the amount of retained austenite during the tempering process and to increase compressive residual stress. The difference between the surface temperature A and the internal temperature B is preferably equal to or higher than 40° C. (i.e., it is preferable that B−A≥40° C.). This is because such a difference is suitable for providing the outer ring 20 including the inner layer 25 and the surface layer 24 as desired. The difference between the surface temperature A and the internal temperature B is preferably equal to or less than 600° C. (i.e., it is preferable that B−A≤600° C.). If the difference between the surface temperature A and the internal temperature B is higher than 600° C., the workpiece W2 may crack.

A tempering time (see "TEMPERING TIME T" in FIG. 4B) for the tempering process is preferably 20 seconds or less. This makes it possible to apply a sufficient compressive residual stress to the workpiece W2. The tempering time T is more preferably 18 seconds or less. The tempering time T is preferably two seconds or more and is more preferably three seconds or more from the viewpoint of preventing or reducing occurrence of temperature variations and stabilizing the quality of the resulting outer ring. As used herein, the term "tempering time" refers to an energization time for induction heating.

The tempering process preferably involves making adjustments such that the surface temperature is in the range of 170° C. to 290° C. inclusive and the internal temperature is in the range of 320° C. to 715° C. inclusive. The surface temperature is preferably 275° C. or less from the viewpoint of increasing the rolling fatigue life of a roller bearing. The internal temperature is more preferably in the range of 365° C. to 575° C. inclusive. The surface temperature in the range of 170° C. to 275° C. inclusive and the internal temperature in the range of 365° C. to 575° C. inclusive are more suitable for increasing the rolling fatigue life, shock resistance, and crushing strength of a roller bearing. As used herein, the term "surface temperature" refers to the temperature of a portion of the surface of the workpiece W2 where the second raceway 26B is to be formed. The surface temperature and the internal temperature may be measured by a K-type thermocouple. The tempering temperature may be adjusted by changing, for example, the frequency, output, and/or tempering time for induction heating.

Figure 5A:
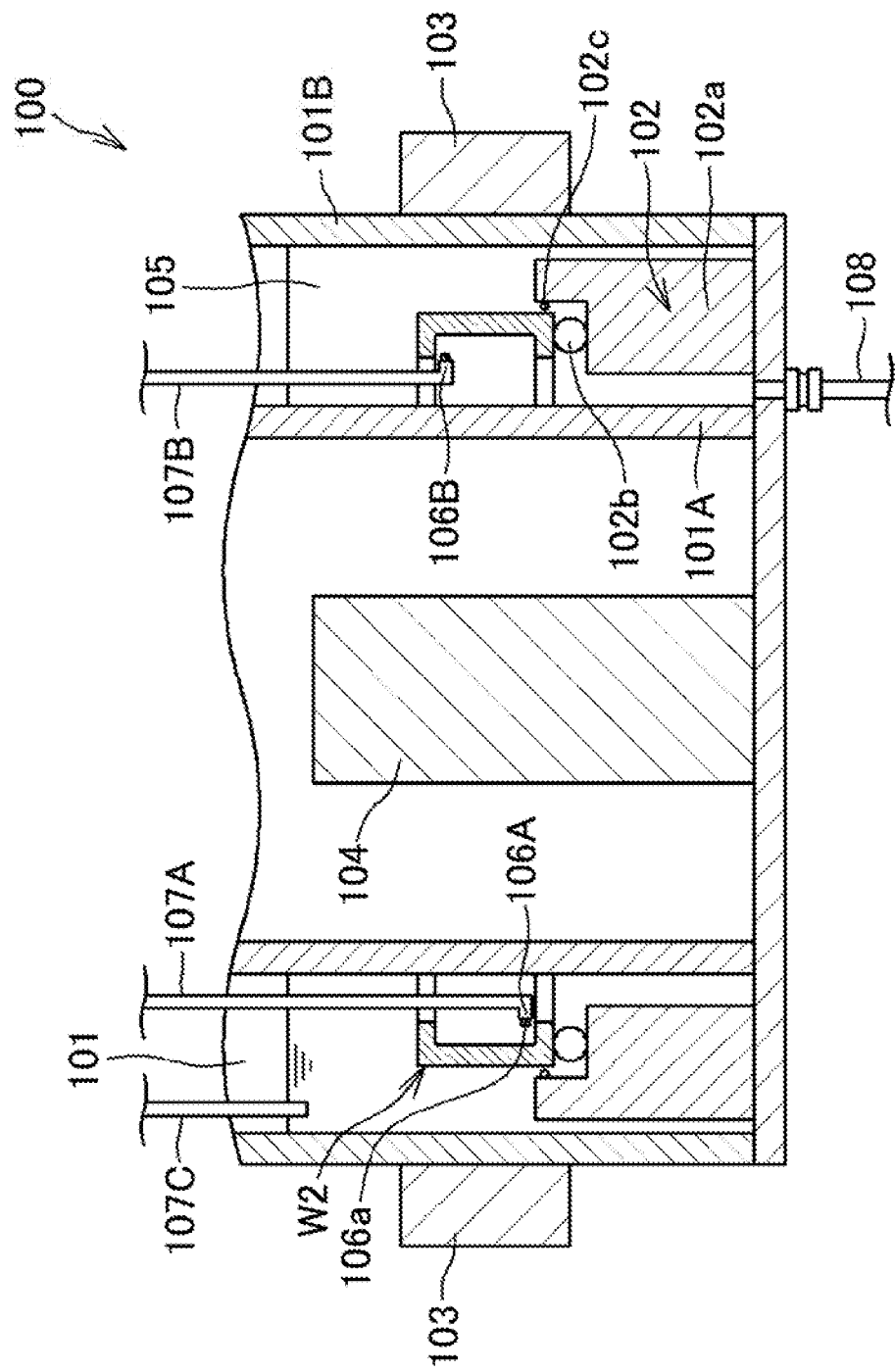
FIG. 5A is a schematic diagram illustrating a heat treatment apparatus to be used in a first manufacturing method of a bearing ring according to the invention.

In the present embodiment, the tempering process is preferably performed using a heat treatment apparatus described below. FIG. 5A is a schematic diagram illustrating an exemplary heat treatment apparatus 100 to be used in the present embodiment. FIG. 5B is an enlarged view of main components of the heat treatment apparatus 100 illustrated in FIG. 5A. The heat treatment apparatus 100 illustrated in FIGS. 5A and 5B includes a treatment tank 101, a retaining jig 102, an induction heating coil 103, a center core 104, a coolant 105, jet nozzles 106A, jet nozzles 106B, a feed pipe 107A, a feed pipe 107B, and a feed pipe 107C. The annular workpiece (half-finished product) W2 that has undergone the hardening process is set in the treatment tank 101 and is heat-treated in the treatment tank 101. The retaining jig 102 retains the workpiece W2. The induction heating coil 103 is disposed outward of the workpiece W2 such that the induction heating coil 103 surrounds the outer periphery of the workpiece W2. The workpiece W2 is induction-heated by the induction heating coil 103. The center core 104 is disposed inward of the workpiece W2. The coolant 105 is stored in the treatment tank 101. The coolant 105 serves as a cooling medium to cool the workpiece W2. The jet nozzles 106A and 106B jet out the coolant 105 onto the workpiece W2. The coolant 105 is fed through the feed pipe 107A to the jet nozzles 106A. The coolant 105 is fed through the feed pipe 107B to the jet nozzles 106B. The coolant 105 is fed through the feed pipe 107C into the treatment tank 101.

The treatment tank 101 is an annular container closed at its bottom. The treatment tank 101 is configured to store the coolant 105. The treatment tank 101 includes a cylindrical inner case 101A and a cylindrical outer case 101B. The treatment tank 101 included in the heat treatment apparatus 100 is a container made of electrically insulating ceramics or electrically insulating synthetic resin. This prevents the heat treatment apparatus 100 itself from being heated. The size of the container may be appropriately changed in accordance with, for example, the application purpose of the heat treatment apparatus 100 and/or the size of the workpiece W2. The coolant 105 is stored in the treatment tank 101. The treatment tank 101 is provided with an outlet 108 through which an excess portion of the coolant 105 is to be discharged out of the treatment tank 101. The workpiece W2 is set in the treatment tank 101 such that the workpiece W2 is immersed in the coolant 105.

The retaining jig 102 includes a jig body 102a, supports (first supports) 102b, and supports (second supports) 102c. Each support 102b receives the lower surface of the workpiece W2 in a point contact manner. The supports 102c prevent or limit horizontal movement of the workpiece W2. Thus, the retaining jig 102 prevents or limits horizontal movement of the workpiece W2 while retaining the workpiece W2 in a point contact manner. Each support 102c may be configured to come into contact with the workpiece W2. Each support 102c may be configured such that a clearance of up to about 0.5 mm is created between each support 102c and the workpiece W2. Creating such a clearance would prevent the supports 102c from pressing the surface of the workpiece W2 if the workpiece W2 thermally expands while being heated.

The supports 102b and 102c each have a spherical shape. Thus, the supports 102b and 102c come into contact with the workpiece W2 in a point contact manner. Such point contact prevents or reduces conduction of heat from the workpiece W2 to the supports 102b and 102c so as to prevent temperature variations in the workpiece W2. The supports 102b and 102c are unlikely to prevent the coolant 105 from cooling the workpiece W2. This precludes overheating of the workpiece W2 resulting from insufficient cooling. The number of supports 102b may be three or more, and the three or more supports 102b may be arranged in a circumferential direction in a plan view. The number of supports 102b is usually three to six. The number of supports 102b is preferably three, and the three supports 102b are preferably disposed at regular intervals. The number of supports 102c may be three or more, and the three or more supports 102c may be arranged in a circumferential direction in the plan view. The number of supports 102c is usually three to six. The number of supports 102c is preferably three, and the three supports 102c are preferably disposed at regular intervals. The retaining jig 102 is made of electrically insulating ceramics or electrically insulating synthetic resin. This prevents the retaining jig 102 itself from being heated, and reduces or eliminates variations in the surface temperature of the workpiece W2.

The induction heating coil 103 is disposed outward of the outer case 101B. The induction heating coil 103 has a spiral shape such that the inner diameter of the induction heating coil 103 is larger than the outer diameter of the outer case 101B. The center core 104 is disposed inward of the inner case 101A. The center core 104 has a rod shape such that the outer diameter of the center core 104 is smaller than the inner diameter of the inner case 101A. The center core 104 is made of silicon steel. The heat treatment apparatus 100 supplies a high-frequency current to the induction heating coil 103 so as to induction-heat an entirety of the workpiece W2 to a desired temperature. The induction heating coil 103 and the center core 104 may be disposed in the treatment tank 101.

The coolant 105 may be any liquid that cools the surface of the workpiece W2. Examples of the coolant 105 include water, oil, and water-soluble polymer. Examples of the oil include quenching oil. Examples of the water-soluble polymer include polyalkylene glycol (PAG). The water-soluble polymer may be dissolved in water and the resulting aqueous solution may be used as the coolant 105. In such a case, the amount of water-soluble polymer to be dissolved in water may be appropriately changed in accordance with, for example, the type of water-soluble polymer to be used. From the viewpoint of efficiently cooling the surface of the workpiece W2, the coolant 105 preferably has a high heat transfer coefficient and is more preferably easy to handle.

The heat treatment apparatus 100 includes the feed pipes 107A to 107C through which the coolant 105 is to be fed to the treatment tank 101. The jet nozzles 106A are mounted on an end of the feed pipe 107A. The jet nozzles 106B are mounted on an end of the feed pipe 107B. The jet nozzles 106A are disposed at predetermined intervals in the circumferential direction of the workpiece W2. The jet nozzles 106B are disposed at predetermined intervals in the circumferential direction of the workpiece W2. The feed pipes 107A and 107B are disposed such that the jet nozzles 106A are different in height from the jet nozzles 106B. The jet nozzles 106A and 106B each have a jet port 106a that faces the outer ring raceway surface 21 of the workpiece W2. The jet ports 106a of the jet nozzles 106A and 106B are disposed such that each jet port 106a faces, at a short distance, a portion of the workpiece W2 where the first raceway 26A is to be formed. The shaded areas of the workpiece W2 illustrated in FIG. 5B indicate the portion of the workpiece W2 where the first raceway 26A is to be formed. The feed pipes 107A and 107B are each provided with a flow regulating valve (not illustrated) and a pressure regulating valve (not illustrated). This makes it possible to change coolant feeding conditions. The heat treatment apparatus 100 includes two different types of feed pipes, i.e., the feed pipes 107A and 107B, such that the jet nozzles 106A mounted on the feed pipe 107A are different in height from the jet nozzle 106B mounted on the feed pipe 107B. Consequently, performing the tempering process using the heat treatment apparatus 100 makes it possible to manufacture a bearing ring for a roller bearing provided with a raceway including two first raceway portions where compressive residual stress is relatively high.

The heat treatment apparatus 100 is configured such that the coolant 105 fed through the feed pipes 107A to 107C is stored in the treatment tank 101 and an excess portion of the coolant 105 is discharged out of the treatment tank 101 through the outlet 108. The heat treatment apparatus 100 may include a circuit (not illustrated) through which the coolant 105 discharged is to be re-fed into the treatment tank 101.

Although not illustrated, the heat treatment apparatus 100 includes, in addition to the components described above, other necessary components, such as a power source required for induction heating, a matcher, and a temperature adjuster to control the temperature of the coolant 105. The heat treatment apparatus 100 may further include a mechanism to rotate the workpiece W2 around its axis during heating, for example.

The tempering process to be performed using the heat treatment apparatus 100 involves disposing the workpiece W2 in the treatment tank 101, and heating the workpiece W2 immersed in the coolant 105. The heating of the workpiece W2 in this case involves effecting induction heating while producing a concentrated flow of the coolant 105, stored in the treatment tank 101, to a portion of the workpiece W2 where the first raceway 26A is to be formed. Specifically, the heating of the workpiece W2 in this case involves, for example, effecting induction heating while causing the coolant 105 to be jetted out of the jet ports 106a of the jet nozzles 106A and 106B onto the portion of the workpiece W2 where the first raceway 26A is to be formed. This cools the portion of the workpiece W2, where the first raceway 26A is to be formed, with a cooling power higher than that for the other portions of the workpiece W2. Thus, carrying out the subsequent steps results in the outer ring 20 in which the compressive residual stress applied to the two first raceway portions 26A1 and 26A2 of the outer ring 20 is higher than the compressive residual stress applied to the other portions of the outer ring 20 (e.g., the second raceway 26B). Performing the tempering process in this manner makes it possible to apply compressive residual stress not only to the first raceway 26A but also to the other portions of the outer ring 20 (e.g., the second raceway 26B), although the compressive residual stress applied to the other portions of the outer ring 20 (e.g., the second raceway 26B) is lower than the compressive residual stress applied to the first raceway 26A.

Performing the tempering process on the workpiece W2 while feeding and jetting out the coolant 105 in the manner described above in order to manufacture the needle roller bearing outer ring 20 produces corner effect. The corner effect makes it more difficult to cool the rib surface 28a of the workpiece W2 (in particular, a portion of the rib surface 28a adjacent to the boundary between the rib surface 28a and a region where the raceway 26 is to be formed). Thus, the rib surface 28a of the workpiece W2 is tempered at a temperature higher than that at which the raceway 26 is tempered. Consequently, the rib 28 (or the rib surface 28a) of the outer ring 20 manufactured has enhanced toughness.

The frequency and output for induction heating described above may be appropriately set in accordance with, for example, the shape of the workpiece W2, the size of the workpiece W2, and/or the cooling power of the coolant 105. Changing the frequency, output, and cooling power for induction heating described above makes it possible to adjust the Vickers hardness of the rib surface 28a. Specifically, when the Vickers hardness of the rib surface 28a needs to be high, induction heating may be effected with a relatively low frequency, a relatively high output, and a relatively high cooling power. When the Vickers hardness of the rib surface 28a needs to be low, induction heating may be effected with a relatively high frequency, a relatively low output, and a relatively high cooling power.

The coolant 105 is preferably jetted out of the jet nozzles 106A and 106B at a rate of 5 to 30 L/min, for example. The rate at which the coolant 105 is to be jetted out of the jet nozzles 106A and 106B may vary depending on, for example, the number of jet nozzles 106A, the number of jet nozzles 106B, the shape of the workpiece W2, the size of the workpiece W2, and/or the cooling power of the coolant 105. In one example, the temperature of the coolant 105 to be fed from the jet nozzles 106A and 106B is preferably in the range of 5° C. to 80° C. inclusive. The temperature of the coolant 105 to be fed from the jet nozzles 106A and 106B may vary depending on, for example, the shape of the workpiece W2, the size of the workpiece W2, and/or the cooling power of the coolant 105.

As illustrated in FIG. 3E, the final step of the first manufacturing method of a bearing ring is to perform a finishing process (such as grinding) on, for example, a portion of the tempered semi-finished product W3 corresponding to the outer ring raceway surface 21. Performing the above-described steps makes it possible to manufacture the needle roller bearing outer ring 20. The outer ring 20 manufactured includes the first raceway 26A including the two first raceway portions (i.e., the first raceway portions 26A1 and 26A2) and the rib 28 that is toughened and resistant to breakage.

Feeding the coolant 105 in such a manner that the coolant 105 is jetted out of a jet nozzle does not necessarily have to involve disposing the jet nozzle such that its jet port faces a portion of the workpiece W2 where the first raceway 26A is to be formed, as long as a concentrated flow of the coolant 105 to the portion of the workpiece W2 where the first raceway 26A is to be formed is produced during cooling. The following description discusses another manufacturing method of a bearing ring for a roller bearing (which will be referred to as a "second manufacturing method of a bearing ring").

Figure 6:
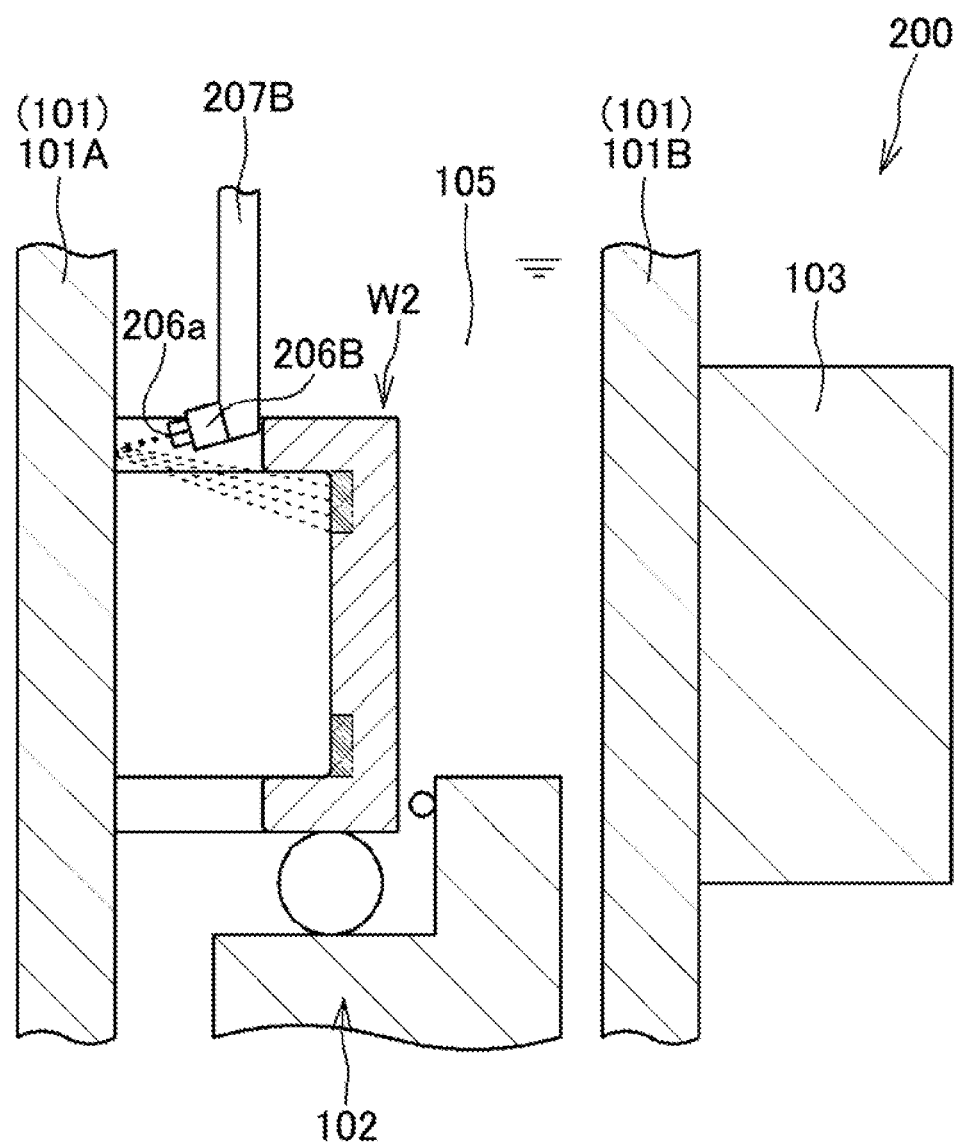
FIG. 6 is an enlarged view of main components of a heat treatment apparatus to be used in a second manufacturing method of a bearing ring according to the invention.

FIG. 6 is an enlarged view of main components of another exemplary heat treatment apparatus 200 to be used in the second manufacturing method of a bearing ring. The second manufacturing method of a bearing ring may involve performing a tempering process using the heat treatment apparatus 200 illustrated in FIG. 6. The heat treatment apparatus 200 is similar in structure to the heat treatment apparatus 100 illustrated in FIGS. 5A and 5B, except that the jet nozzles of the heat treatment apparatus 200 are different in mounted height and orientation from those of the heat treatment apparatus 100. Components of the heat treatment apparatus 200 similar to those of the heat treatment apparatus 100 are identified by the same reference characters as those used for the heat treatment apparatus 100.

Similarly to the tempering process performed using the heat treatment apparatus 100, the tempering process performed using the heat treatment apparatus 200 involves: disposing the workpiece W2 in the treatment tank 101 such that the workpiece W2 is immersed in the coolant 105; and effecting induction heating while producing a concentrated flow of the coolant 105 to a portion of the workpiece W2 where the first raceway 26A is to be formed. The shaded areas of the workpiece W2 in FIG. 6 indicate the portion of the workpiece W2 where the first raceway 26A is to be formed. Jet nozzles 206B mounted on an end of a feed pipe 207B are disposed such that the coolant 105 jetted out of jet ports 206a of the jet nozzles 206B hits an outer wall surface of the inner case 101A located inward of the workpiece W2 and is then directed to the portion of the workpiece W2 where the first raceway 26A is to be formed. Thus, when the tempering process is performed using the heat treatment apparatus 200, effecting induction heating while feeding the coolant 105 from the jet nozzles 206B makes it possible to cool the portion of the workpiece W2, where the first raceway 26A is to be formed, with a cooling power higher than that for the other portions of the workpiece W2. Accordingly, carrying out the subsequent steps after the tempering process is performed using the heat treatment apparatus 200 results in the outer ring 20 in which the compressive residual stress applied to the first raceway 26A is higher than the compressive residual stress applied to the other portions of the outer ring 20 (e.g., the second raceway 26B). Performing the tempering process using the heat treatment apparatus 200 makes it possible to apply compressive residual stress not only to the first raceway 26A but also to the other portions of the outer ring 20 (e.g., the second raceway 26B), although the compressive residual stress applied to the other portions of the outer ring 20 (e.g., the second raceway 26B) is lower than the compressive residual stress applied to the first raceway 26A.

Similarly to the tempering process performed using the heat treatment apparatus 100, the tempering process performed using the heat treatment apparatus 200 may involve appropriately setting the frequency and output for induction heating in accordance with, for example, the shape of the workpiece W2, the size of the workpiece W2, and/or the cooling power of the coolant 105. The rate at which the coolant 105 is to be jetted out of the jet nozzles 206B and the temperature of the coolant 105 may be equal to or approximately equal to those for the tempering process performed using the heat treatment apparatus 100. The jet nozzles 206B of the heat treatment apparatus 200 illustrated in FIG. 6 are equivalent to the jet nozzles 106B of the heat treatment apparatus 100. Although not illustrated, the heat treatment apparatus 200 includes a plurality of other jet nozzles equivalent to the jet nozzles 106A of the heat treatment apparatus 100 and different in height from the jet nozzles 206B.

The heat treatment apparatuses 100 and 200 are each provided with the center core 104 located inward of the workpiece W2. Alternatively, the heat treatment apparatuses 100 and 200 may each be provided with, instead of the center core 104, an additional induction heating coil located inward of the workpiece W2. Providing such an additional induction heating coil also makes it possible to heat an entirety of the workpiece W2.

The raceway 26 of the outer ring 20 according to the present embodiment includes the first raceway 26A including the two first raceway portions (i.e., the first raceway portions 26A1 and 26A2), such that the first raceway 26A is located in an edge load region where the pressure of contact between the first raceway 26A and the rolling contact surface 31 of each needle roller 30 is high. Alternatively, the first raceway 26A of the outer ring 20 according to the embodiment of the invention may include only one of the two first raceway portions (i.e., the first raceway portions 26A1 and 26A2).

The bearing ring for a roller bearing according to the embodiment of the invention is not limited to an outer ring of a needle roller bearing but may be an inner ring of a needle roller bearing. Alternatively, the bearing ring for a roller bearing according to the embodiment of the invention may be an inner ring or an outer ring of any other roller bearing, such as a cylindrical roller bearing.

Figure 7:
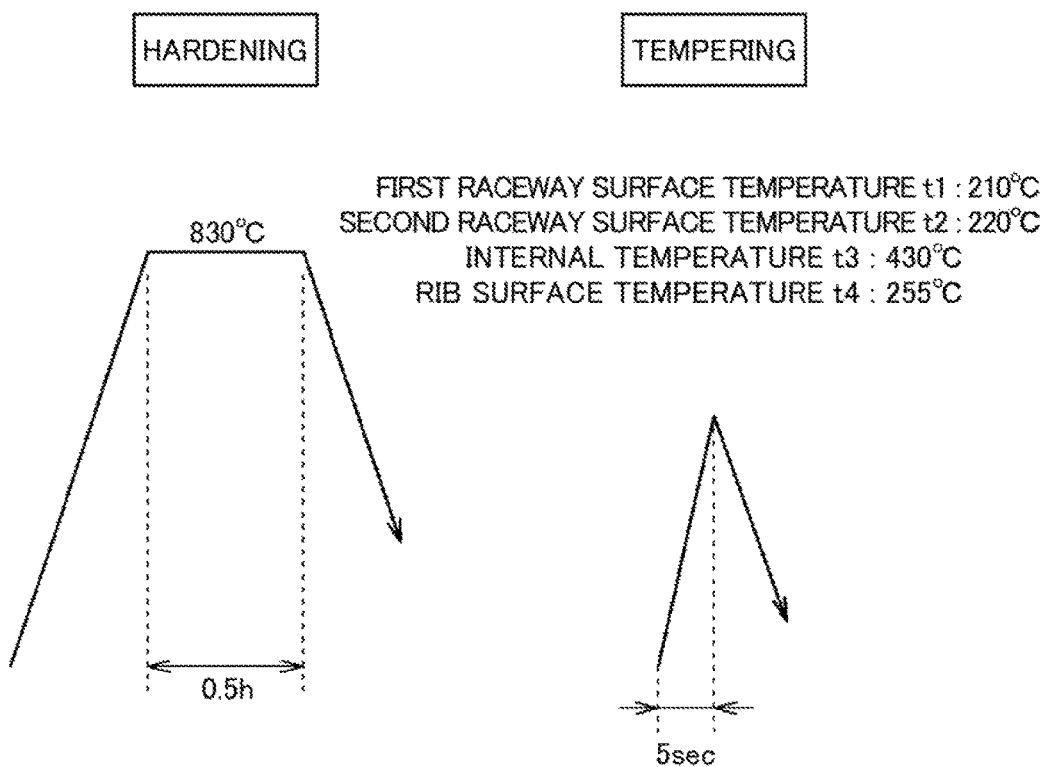
FIG. 7 is a chart illustrating heat treatment requirements for Example 1.

The following description discusses the effects of the embodiment of the invention on the basis of Examples 1 to 4 and Comparative Examples 1 to 5. The embodiment of the invention is not limited to any of Examples 1 to 4 and Comparative Examples 1 to 5 below. Example 1 will be described below. In Example 1, an annular material made of SUJ2 steel was prepared, and the annular material prepared was cut into a predetermined shape so as to provide an outer ring workpiece having an outside diameter of 40 mm and a thickness of 2.0 mm (see the reference character Y in FIG. 2). Subsequently, the workpiece provided was subjected to a hardening process performed in a manner that meets the heat treatment requirements illustrated in Table 1 and FIG. 7, and a tempering process performed in a manner that meets the heat treatment requirements illustrated in Table 1 and FIG. 7. The workpiece was then subjected to a grinding process so as to provide an outer ring specimen for a bearing (whose bearing number is BHTM3020). The hardening process was performed using an atmosphere heat treatment furnace. The tempering process was performed using the heat treatment apparatus 100 illustrated in FIG. 5. FIG. 7 is a chart illustrating the heat treatment requirements for Example 1. In Example 1, as illustrated in FIG. 7, an entirety of the workpiece was heated at 830° C. for half an hour, and was then oil-quenched at 80° C. Subsequently, the workpiece was set in the heat treatment apparatus 100 illustrated in FIG. 5 and was subjected to the tempering process that involves effecting induction heating at a frequency of 3110 Hz and an output of 70 kW for five seconds while cooling the surface of the workpiece, such that a first raceway surface temperature t1 was 210° C., a second raceway surface temperature t2 was 220° C., an internal temperature t3 was 430° C., and a rib surface temperature t4 was 255° C. The tempering process was performed, with the hardened workpiece immersed in water (which is a coolant) at 25° C. During the tempering process, cooling water was jetted out of the jet nozzles 106A and 106B at a flow rate of 5 L/min concurrently with the start of heating. The first raceway surface temperature t1 was determined by calculating the average of temperatures measured at axial centers M (see FIG. 2) of the surfaces of two first raceway portions. The second raceway surface temperature t2 was determined by measuring a temperature at an axial center N (see FIG. 2) of the surface of a second raceway located between the two first raceway portions. The internal temperature t3 was determined by measuring a temperature at a location U (see FIG. 2) on a cross-section taken in a radial direction of the workpiece. The location U is located radially outward of the axial center N of the surface of the second raceway by a distance corresponding to one-half of the thickness of the workpiece. The rib surface temperature t4 was determined by calculating the average of temperatures measured at radial centers W (see FIG. 2) of the rib surfaces of two ribs.

Examples 2 to 4 will be described below. In each of Examples 2 to 4, an outer ring specimen was provided similarly to Example 1 except that requirements (e.g., frequency and output) for induction heating during tempering and the flow rate of cooling water jetted out of the jet nozzles 106A and 106B were changed as indicated in Table 1. Tempering temperatures (e.g., the first raceway surface temperature t1, the second raceway surface temperature t2, the internal temperature t3, and the rib surface temperature t4) in each of Examples 2 to 4 are given in Table 1.

Figure 8:
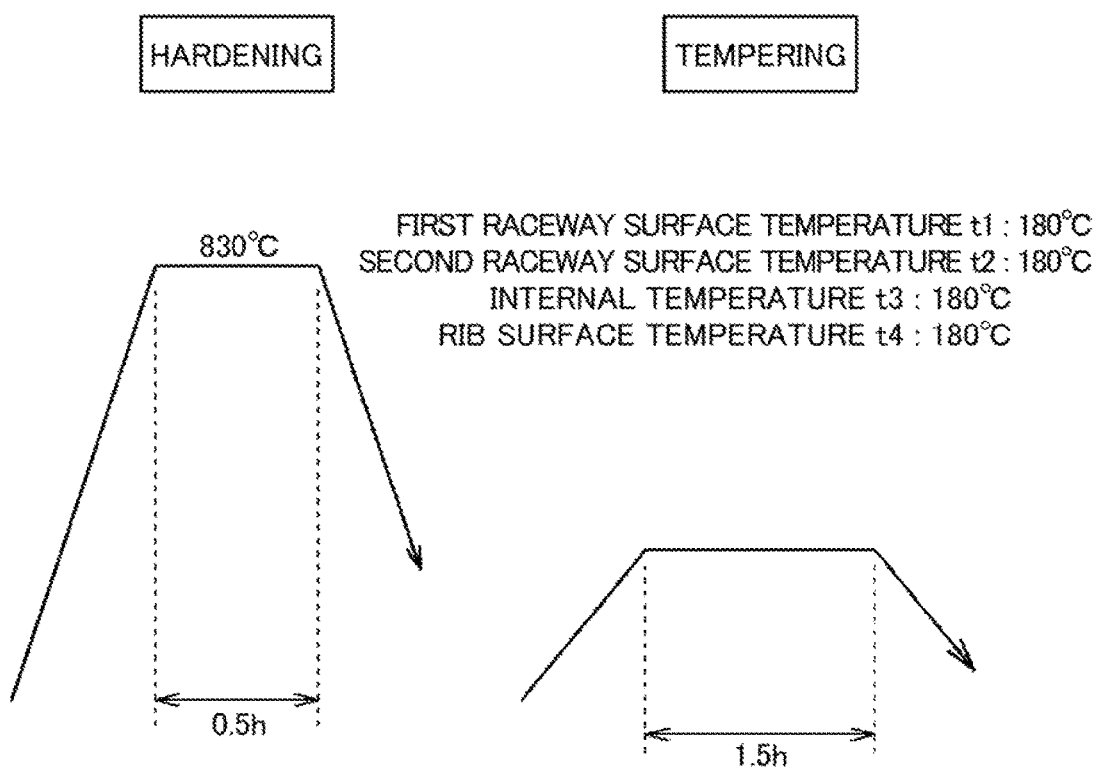
FIG. 8 is a chart illustrating heat treatment requirements for Comparative Example 1.

Comparative Example 1 will be described below. In Comparative Example 1, an outer ring specimen was provided similarly to Example 1 except that a tempering process was performed using a tempering furnace in a manner that meets the requirements illustrated in FIG. 8. FIG. 8 is a chart illustrating the heat treatment requirements for Comparative Example 1. In Comparative Example 1, an entirety of the workpiece was heated at 830° C. for half an hour, oil-quenched at 80° C., and then tempered by heating the workpiece at 180° C. for one and a half hours. The first raceway surface temperature t1, the second raceway surface temperature t2, the internal temperature t3, and the rib surface temperature t4 in Comparative Example 1 are given in Table 1.

Figure 9:
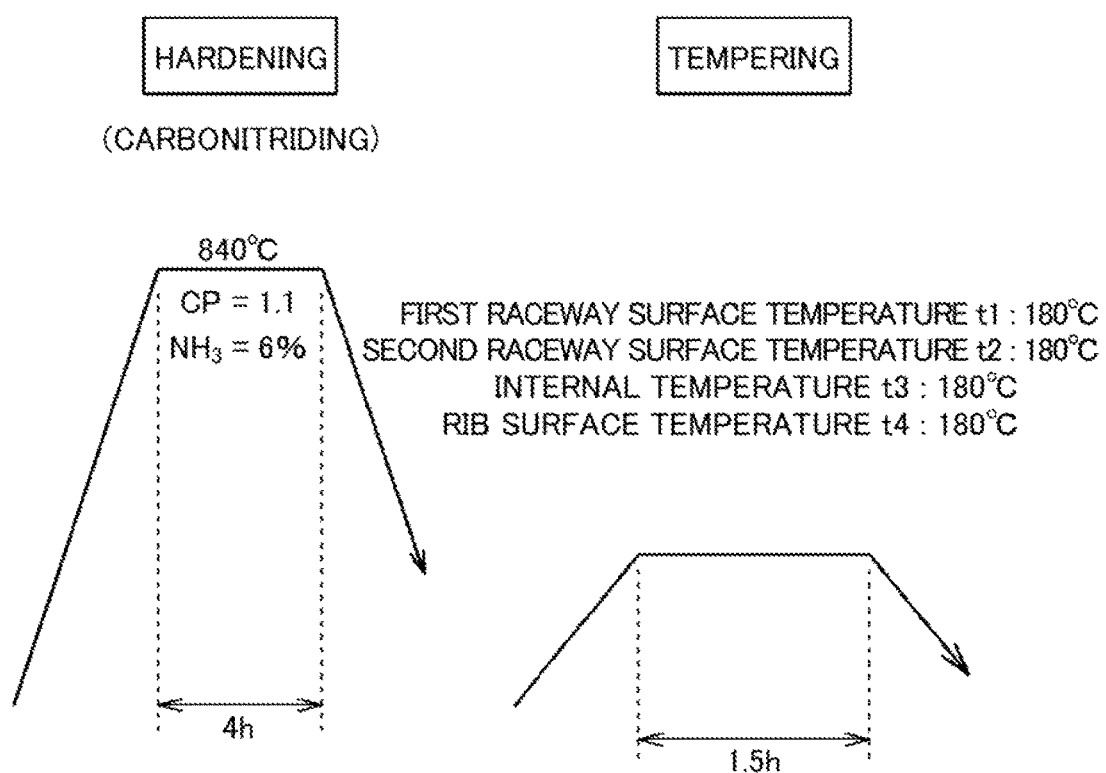
FIG. 9 is a chart illustrating heat treatment requirements for Comparative Example 2.

Comparative Example 2 will be described below. In Comparative Example 2, an outer ring workpiece made of SUJ2 steel was provided similarly to Example 1. The workpiece provided was then subjected to a carbonitriding hardening process in a carbonitriding atmosphere with a carbon potential of 1.1 and an ammonia gas concentration of 6% by volume in a manner that meets heat treatment requirements illustrated in FIG. 9. Subsequently, the workpiece was subjected to a tempering process similar to that performed in Comparative Example 1 and was then subjected to a grinding process so as to provide an outer ring specimen for a bearing (whose bearing number is BHTM3020). FIG. 9 is a chart illustrating the heat treatment requirements for Comparative Example 2. In Comparative Example 2, the workpiece was subjected to carbonitriding hardening by heating the workpiece at 840° C. for four hours, oil-cooled to 80° C., and then tempered by heating the workpiece at 180° C. for one and a half hours.

Figure 10:
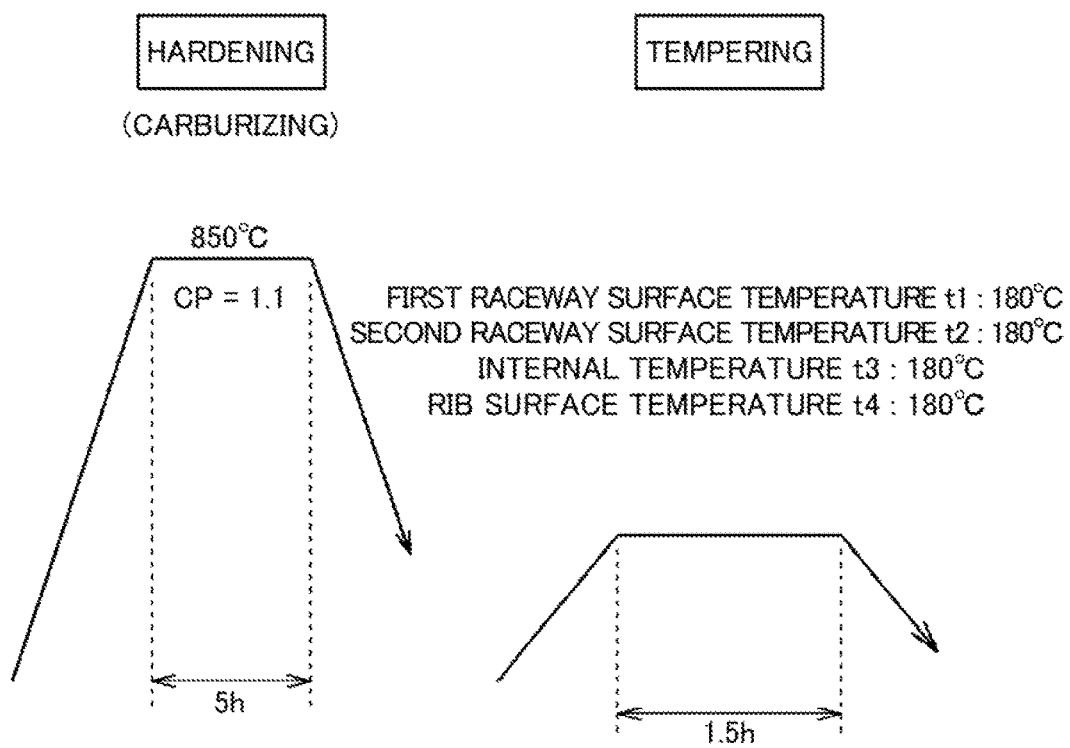
FIG. 10 is a chart illustrating heat treatment requirements for Comparative Example 3.

Comparative Example 3 will be described below. In Comparative Example 3, an annular material made of SAE5120 steel was prepared, and the annular material prepared was cut into a predetermined shape so as to provide an outer ring workpiece having an outside diameter of 40 mm and a thickness of 2.0 mm (see the reference character Y in FIG. 2). The workpiece provided was then subjected to a carburizing hardening process in an atmosphere with a carbon potential of 1.1 in a manner that meets heat treatment requirements illustrated in FIG. 10. Subsequently, the workpiece was subjected to a tempering process similar to that performed in Comparative Example 1 and was then subjected to a grinding process so as to provide an outer ring specimen for a bearing (whose bearing number is BHTM3020). FIG. 10 is a chart illustrating the heat treatment requirements for Comparative Example 3. In Comparative Example 3, the workpiece was subjected to carburizing hardening by heating the workpiece at 850° C. for five hours, oil-quenched at 80° C., and then tempered by heating the workpiece at 180° C. for one and a half hours.

Comparative Examples 4 and 5 will be described below. In each of Comparative Examples 4 and 5, an outer ring specimen was provided similarly to Example 1 except that requirements (e.g., frequency and output) for induction heating during tempering and the flow rate of cooling water jetted out of the jet nozzles 106A and 106B were changed as indicated in Table 1. Tempering temperatures (e.g., the first raceway surface temperature t1, the second raceway surface temperature t2, the internal temperature t3, and the rib surface temperature t4) in each of Comparative Examples 4 and 5 are given in Table 1.

TABLE 1

| | STEEL TYPE | HEAT TREATMENT | HARDENING REQUIREMENTS | TEMPERING REQUIREMENTS | | |
|---|---|---|---|---|---|---|
| | | | | FREQUENCY (Hz) | OUTPUT (kW) | SECOND RACEWAY SURFACE TEMPERATURE (° C.) |
| Example 1 | SUJ2 | Hardening Tempering | 830° C. 0.5 h | 3110 | 70 | 220° C. 5 sec |
| Example 2 | SUJ2 | Hardening Tempering | 830° C. 0.5 h | 3120 | 80 | 215° C. 5 sec |
| Example 3 | SUJ2 | Hardening Tempering | 830° C. 0.5 h | 3120 | 79 | 213° C. 5 sec |
| Example 4 | SUJ2 | Hardening Tempering | 830° C. 0.5 h | 3120 | 80 | 212° C. 5 sec |
| Comparative Example 1 | SUJ2 | Hardening Tempering | 830° C. 0.5 h | — | — | 180° C. 1.5 h |
| Comparative Example 2 | SUJ2 | Carbonitriding Hardening Tempering | 840° C. 4 h | — | — | 180° C. 1.5 h |
| Comparative Example 3 | SAE5120 | Carburizing Hardening Tempering | 850° C. 5 h | — | — | 180° C. 1.5 h |
| Comparative Example 4 | SUJ2 | Hardening Tempering | 830° C. 0.5 h | 3130 | 65 | 195° C. 5 sec |
| Comparative Example 5 | SUJ2 | Hardening Tempering | 830° C. 0.5 h | 3120 | 69 | 190° C. 5 sec |

| | TEMPERING REQUIREMENTS | | | |
|---|---|---|---|---|
| | FIRST RACEWAY SURFACE TEMPERATURE (° C.) | RIB SURFACE TEMPERATURE (° C.) | INTERNAL TEMPERATURE (° C.) | FLOW RATE OF COOLANT JETTED OUT (L/min) |
| Example 1 | 210° C. 5 sec | 255° C. 5 sec | 430° C. 5 sec | 5 |
| Example 2 | 199° C. 5 sec | 245° C. 5 sec | 428° C. 5 sec | 10 |
| Example 3 | 183° C. 5 sec | 230° C. 5 sec | 425° C. 5 sec | 20 |
| Example 4 | 174° C. 5 sec | 215° C. 5 sec | 422° C. 5 sec | 30 |
| Comparative Example 1 | ← | ← | ← | — |
| Comparative Example 2 | ← | ← | ← | — |
| Comparative Example 3 | ← | ← | ← | — |
| Comparative Example 4 | 167° C. 5 sec | 185° C. 5 sec | 425° C. 5 sec | 40 |
| Comparative Example 5 | 154° C. 5 sec | 165° C. 5 sec | 420° C. 5 sec | 50 |

The following description discusses evaluations of the specimens. Hardness distributions in cross-sections of the outer ring specimens in Examples 1 to 4 and Comparative Examples 1 to 5 were measured using a Vickers hardness tester. The measurements of hardness distributions in cross-sections of the specimens in Examples 1 to 4 and Comparative Examples 1 to 5 reveal that the Vickers hardness of a surface layer cross-section gradually decreases from an uppermost surface toward an inner layer. The hardness distributions were also used to calculate high-hardness surface layer depths (which will be described below).

The following items were checked for the outer ring specimen in each of Examples 1 to 4 and Comparative Examples 1 to 5: the Vickers hardness of the surface of a raceway (including first and second raceways), inner layer hardness, high-hardness surface layer depth of the raceway, compressive residual stress, rolling fatigue life, Charpy impact value, crushing strength, and manufacturing cost. The structures of the surface layer and inner layer of the outer ring specimen in each of Examples 1 to 4 and Comparative Examples 1 to 5 were also observed using an optical microscope. The structures of the surface layers that were observed were the structures of the second raceways.

The measurement of the Vickers hardness of raceway surfaces involved bringing a Vickers indenter into contact with the axial center of the surface of the raceway (including the first and second raceways) of each outer ring specimen. The measurement of the Vickers hardness of rib surfaces involved bringing a Vickers indenter into contact with the radial center of the rib surface of each outer ring specimen. The measurement of the inner layer hardness involved bringing a Vickers indenter into contact with a location on a cross-section (see FIG. 2) taken in a radial direction of each outer ring specimen. This location is located radially outward of the axial center of the surface of the second raceway by a distance corresponding to one-half of the thickness of the specimen. The measurement of the high-hardness surface layer depth involved calculating a maximum shear stress depth on the basis of a Hertzian contact theory so as to calculate the high-hardness surface layer depth in accordance with the maximum shear stress depth and the Vickers hardness distribution mentioned above. The measurement of the compressive residual stress involved conducting an X-ray diffraction method using a residual stress measuring device. The measurement of the rolling fatigue life involved conducting a radial type rolling fatigue life test.

The measurement of the Charpy impact value involved conducting a Charpy impact test in accordance with JIS K7111-1. The measurement of the crushing strength involved: defining a first circumferential location on each outer ring specimen and a second circumferential location displaced circumferentially by 180 degrees with respect to the first circumferential location; placing the specimen between holders of an Amsler type testing machine in a radial direction of the specimen; deforming the specimen such that the first and second circumferential locations come closer to each other at a velocity of 0.5 mm/min in a direction connecting the first and second circumferential locations and perpendicular to the axis of the specimen until the specimen breaks; and estimating a radial load at the time of breakage. Results of these measurements are given in Table 2 below. The rolling fatigue life, Charpy impact value, and crushing strength in Table 2 are expressed as values relative to the measurement values for Comparative Example 1. The circles for "COST" in Table 2 indicate numerical values equal to or smaller than the estimated value for the cost of the outer ring in Comparative Example 1.

TABLE 2

| | MAIN STRUCTURE OF SURFACE LAYER | MAIN STRUCTURE OF INNER LAYER | SURFACE HARDNESS (HV) | | | INNER LAYER HARDNESS (HV) | HIGH-HARDNESS SURFACE LAYER DEPTH | |
|---|---|---|---|---|---|---|---|---|
| | | | SECOND RACEWAY | FIRST RACEWAY | RIB | | SECOND RACEWAY | FIRST RACEWAY |
| Example 1 | High-Carbon Martensite | Sorbite | 721 | 740 | 465 | 540 | 3.8Z0 | 3.9Z0 |
| Example 2 | High-Carbon Martensite | Sorbite | 729 | 755 | 470 | 538 | 4.0Z0 | 4.1Z0 |
| Example 3 | High-Carbon Martensite | Sorbite | 736 | 765 | 475 | 537 | 4.2Z0 | 4.3Z0 |
| Example 4 | High-Carbon Martensite | Sorbite | 741 | 770 | 480 | 537 | 4.5Z0 | 4.7Z0 |
| Comparative Example 1 | High-Carbon Martensite | High-Carbon Martensite | 740 | ← | ← | 740 | — | — |
| Comparative Example 2 | High-Carbon Martensite | High-Carbon Martensite | 783 | ← | ← | 782 | — | — |
| Comparative Example 3 | High-Carbon Martensite | Low-Carbon Martensite | 753 | ← | ← | 550 | 5.8Z0 | ← |
| Comparative Example 4 | High-Carbon Martensite | Sorbite | 765 | 780 | 590 | 535 | 5.0Z0 | 5.3Z0 |
| Comparative Example 5 | High-Carbon Martensite | Sorbite | 767 | 795 | 550 | 540 | 5.4Z0 | 5.7Z0 |

| | COMPRESSIVE RESIDUAL STRESS (MPa) | | ROLLING FATIGUE LIFE (RELATIVE VALUE) | CHARPY IMPACT VALUE (RELATIVE VALUE) | CRUSHING STRENGTH (RELATIVE VALUE) | COST |
|---|---|---|---|---|---|---|
| | SECOND RACEWAY | FIRST RACEWAY | | | | |
| Example 1 | 200 | 220 | 1.10 | 1.20 | 1.00 | ○ |
| Example 2 | 212 | 246 | 1.10 | 1.15 | 1.00 | ○ |
| Example 3 | 253 | 278 | 1.13 | 1.10 | 1.00 | ○ |
| Example 4 | 255 | 289 | 1.15 | 1.05 | 1.00 | ○ |

TABLE 2-continued

| | | | | | | |
|---|---|---|---|---|---|---|
| Comparative Example 1 | 0 | 0 | 1.00 | 1.00 | 1.00 | ○ |
| Comparative Example 2 | 245 | ← | 1.20 | 1.00 | 1.20 | x |
| Comparative Example 3 | 207 | ← | 1.00 | 2.00 | 0.80 | x |
| Comparative Example 4 | 256 | 300 | 1.15 | 0.95 | 1.00 | ○ |
| Comparative Example 5 | 301 | 320 | 1.20 | 0.90 | 1.00 | ○ |

The results given in Table 2 reveal that the use of the bearing rings for roller bearings according to the embodiment of the invention makes it possible to inexpensively provide long-life roller bearings having increased rolling fatigue life.

The invention inexpensively provides long-life roller bearings having increased rolling fatigue life.

What is claimed is:

1. An annular bearing ring for a roller bearing made of high-carbon chromium bearing steel, the bearing ring comprising:
   a rib;
   an inner layer made of tempered martensite or sorbite, the inner layer having a Vickers hardness of 450 HV or more but less than 550 HV; and
   a surface layer made of tempered martensite, the surface layer surrounding an entirety of a periphery of the inner layer, wherein
   the surface layer includes a raceway including a raceway surface to be in rolling contact with a roller,
   the raceway includes
      a first raceway whose raceway surface is under a relatively high compressive residual stress, and
      a second raceway whose raceway surface is under a compressive residual stress lower than the compressive residual stress applied to the raceway surface of the first raceway,
   the raceway surface of the second raceway has a Vickers hardness of 700 HV or more but less than 800 HV,
   the raceway surface of the first raceway includes a portion that is harder than the raceway surface of the second raceway and that is to be in contact with an axial end of a rolling contact surface of the roller, and
   the rib includes a rib surface having a Vickers hardness of 450 HV or more but less than 550 HV.

2. The bearing ring for a roller bearing according to claim 1, wherein
   the raceway surface of the first raceway is under a compressive residual stress of 200 MPa or more.

3. A method for manufacturing a bearing ring for a roller bearing according to claim 2, the method comprising the steps of:
   (A) hardening an annular workpiece made of high-carbon chromium bearing steel;
   (B) tempering the hardened workpiece by heating the workpiece entirely immersed in a coolant; and
   (C) finishing the tempered workpiece, wherein
   step (B) involves heating the workpiece while producing a concentrated flow of the coolant, in which the hardened workpiece is immersed, to a portion of the workpiece where the first raceway is to be formed.

4. The manufacturing method of the bearing ring for a roller bearing according to claim 3, wherein
   step (B) involves using a jet nozzle from which the coolant is to be jetted out,
   the jet nozzle includes a jet port that faces the portion of the workpiece where the first raceway is to be formed, and
   the coolant is jetted out of the jet port onto the portion of the workpiece where the first raceway is to be formed.

5. A needle roller bearing to support a shaft such that the shaft is rotatable, the needle roller bearing comprising:
   an outer ring whose inner peripheral surface includes a raceway; and
   a plurality of needle rollers disposed radially inward of the outer ring, wherein
   the outer ring is the bearing ring for a roller bearing according to claim 2.

6. A method for manufacturing a bearing ring for a roller bearing according to claim 1, the method comprising the steps of:
   (A) hardening an annular workpiece made of high-carbon chromium bearing steel;
   (B) tempering the hardened workpiece by heating the workpiece entirely immersed in a coolant; and
   (C) finishing the tempered workpiece, wherein
   step (B) involves heating the workpiece while producing a concentrated flow of the coolant, in which the hardened workpiece is immersed, to a portion of the workpiece where the first raceway is to be formed.

7. The manufacturing method of the bearing ring for a roller bearing according to claim 3, wherein
   step (B) involves using a jet nozzle from which the coolant is to be jetted out,
   the jet nozzle includes a jet port that faces the portion of the workpiece where the first raceway is to be formed, and
   the coolant is jetted out of the jet port onto the portion of the workpiece where the first raceway is to be formed.

8. A needle roller bearing to support a shaft such that the shaft is rotatable, the needle roller bearing comprising:
   an outer ring whose inner peripheral surface includes a raceway; and
   a plurality of needle rollers disposed radially inward of the outer ring, wherein
   the outer ring is the bearing ring for a roller bearing according to claim 1.

* * * * *